May 8, 1962 W. R. GARRETT 3,033,011
RESILIENT ROTARY DRIVE FLUID CONDUIT CONNECTION
Filed Aug. 31, 1960 3 Sheets-Sheet 1
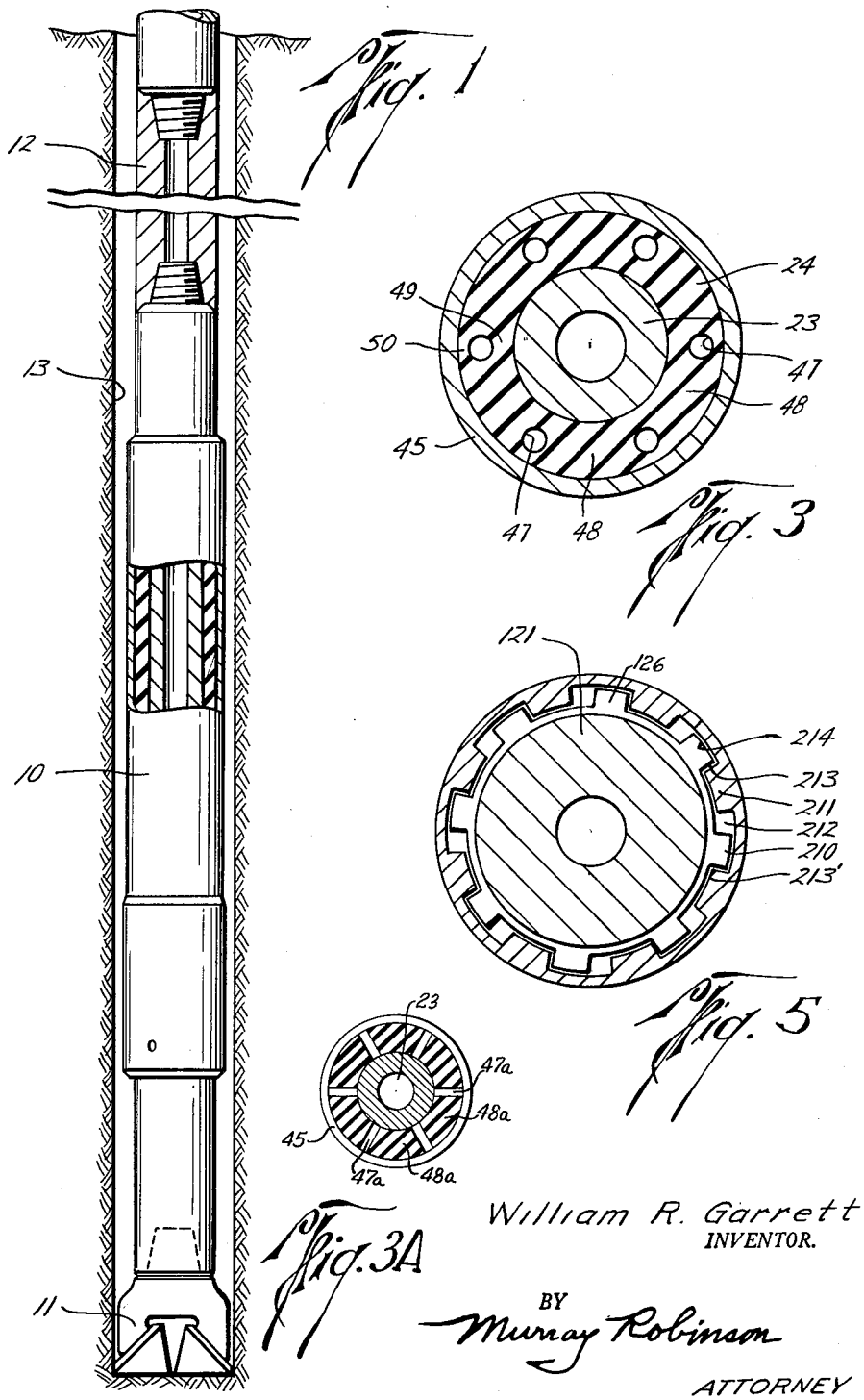
William R. Garrett
INVENTOR.
BY Murray Robinson
ATTORNEY

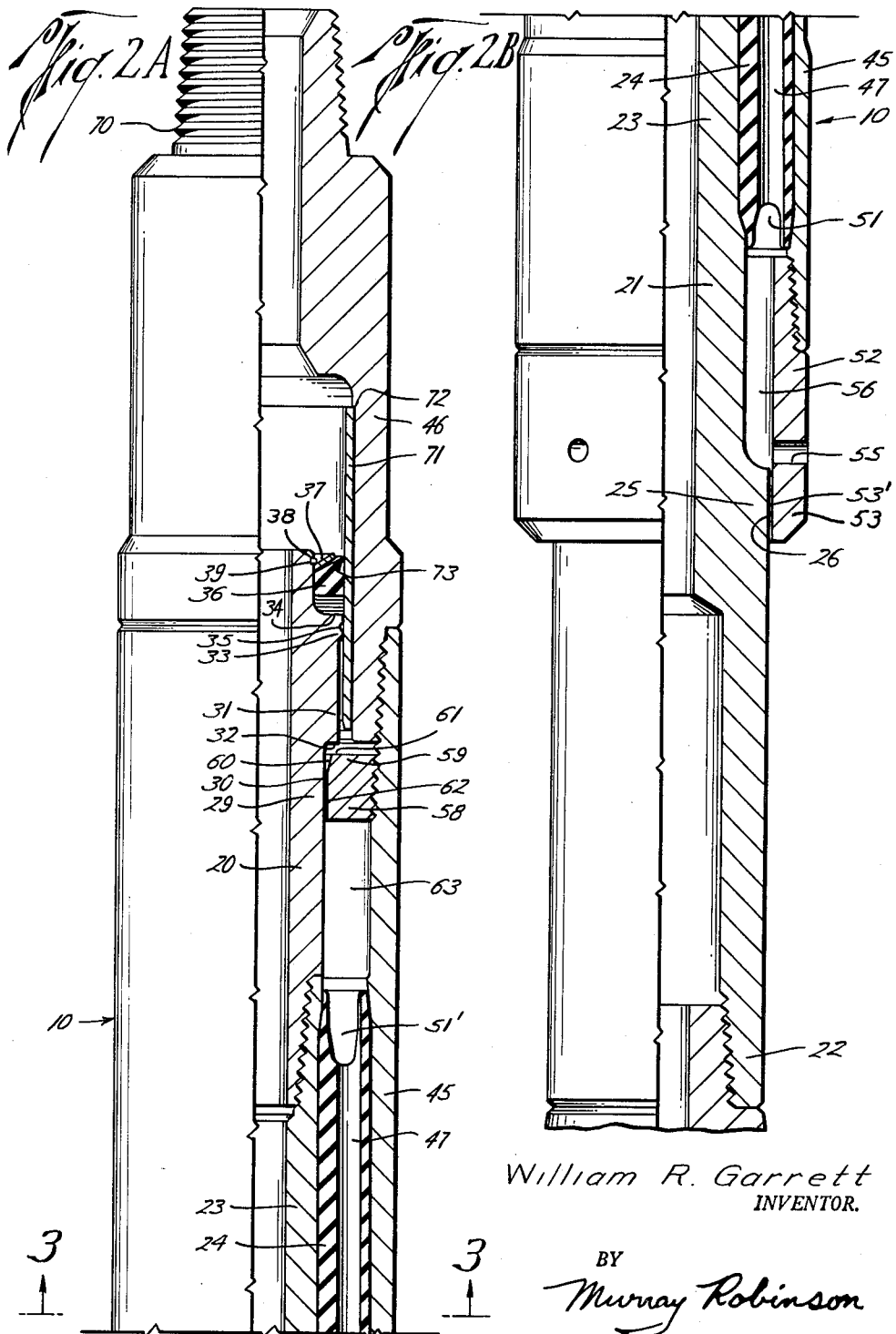

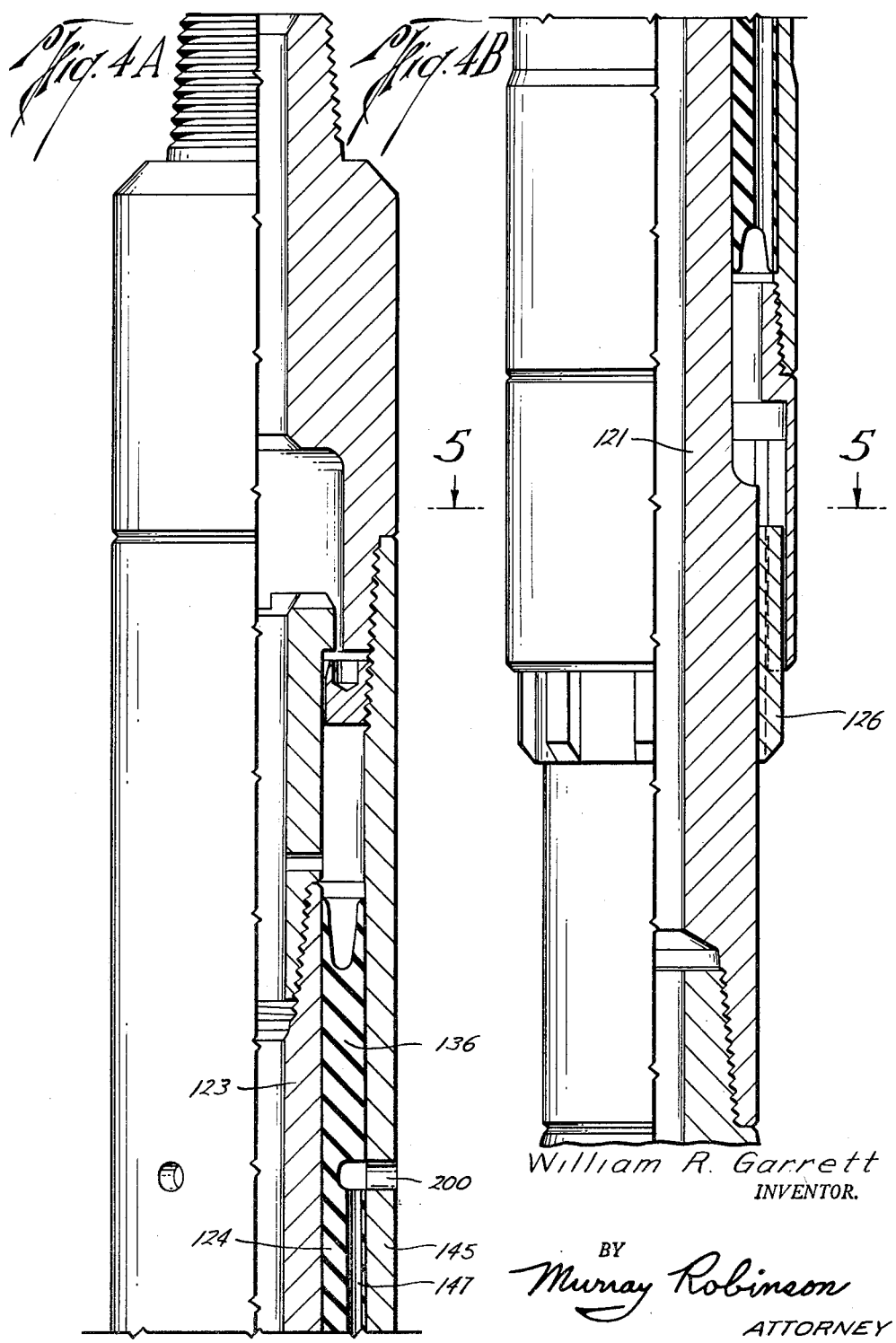

United States Patent Office 3,033,011
Patented May 8, 1962

3,033,011
RESILIENT ROTARY DRIVE FLUID
CONDUIT CONNECTION
William R. Garrett, Midland, Tex., assignor to Drilco
Oil Tools, Inc., a corporation of Texas
Filed Aug. 31, 1960, Ser. No. 53,268
19 Claims. (Cl. 64—11)

This invention pertains to drill strings used in the rotary method of drilling holes, e.g. oil and gas wells, and more particularly to resilient rotary drive fluid conduit connections used in such drill strings, especially between the drill bit and drill collar, to dampen vibrations and reduce shocks ordinarily transmitted from the bit to the drill collars and drill pipe thereabove.

Resilient rotary drive fluid conduit connections of the foregoing type comprise an inner pipe, an outer tube coaxial therewith, and a rubber sleeve in an annular space formed between the outside of the pipe and the inside of the tube, with suitable arrangement for transmitting torsional, axial, and other forces through the rubber sleeve between pipe and tube. Such connections are shown for example in Patents:

1,960,688—Archer—1934
2,325,132—Haushalter et al.—1943
2,563,515—Brown—1951
2,620,165—Crickmer—1952
2,795,398—Ragland—1957 all classified in the United States Patent Office in class 255, Earth Boring, subclass 28, Rods. One method of arranging the rubber sleeve to enable it to transfer torsional, axial, lateral, and other forces between the pipe and the tube is to bond the rubber to the pipe and tube by vulcanization. It is to such an arrangement that the present construction is directed.

According to the invention, the rubber sleeve is circumferentially divided into a plurality of arcuate sections with spaces therebetween, each section extending uninterruptedly axially of the sleeve. The edges of the sections adjacent the spaces therebetween provide free surface areas which can deform to permit the section to shrink as the rubber is vulcanized, thereby reducing the shrinkage stresses well below the yield point, thereby avoiding initial tears, cracks, and excessively prestressed areas in the rubber sleeve whereby its life is greatly lengthened. A seal is provided between the pipe and the tube to prevent fluid from leaking out of the pipe through the spaces between the sections. Preferably the spaces between the sections are cylindrical holes formed by rods placed in the annulus between pipe and tube before rubber is injected into the annulus; the sections are thus joined together at their inner and outer peripheries by thin webs of rubber into one integral sleeve. Lateral guides between the pipe and tube allow relative axial movement thereof but prevent bending loads from being imposed on the rubber sleeve therebetween.

For a detailed description of a preferred embodiment of the invention and modifications thereof reference will now be made to the accompanying drawings wherein:

FIGURE 1 is an elevation showing a connection embodying the invention disposed between a drill bit and a drill collar forming therewith the lower end of a drill string;

FIGURES 2A and 2B together form an elevation, partly in section, showing the connection of FIGURE 1 to a larger scale;

FIGURE 3 is a section taken on line 3—3 of FIGURE 2A;

FIGURE 3A is a view similar to FIGURE 3 showing a modification;

FIGURES 4A and 4B together form an elevation, partly in section, of a modified form of connection embodying the invention; and FIGURE 5 is a section on line 5—5 of FIGURE 4B.

Referring now to FIGURE 1, there is shown a connection 10 embodying the invention. The connection is disposed between a drill bit 11 therebelow and a drill collar sub 12 thereabove. The drill bit, drill collar sub and connection therebetween are shown in the bottom of well 13.

Referring now to FIGURES 2A and 2B, there are shown the details of connection 10. The connection includes a pipe made up of a nipple 20 threadedly connected to a hollow mandrel 21 therebelow. The mandrel includes a threaded box 22 at its lower end for making a threaded connection with a pin on the top of a bit, such as bit 11 of FIGURE 1. The mandrel further includes a drive shaft 23 at its upper end to the outer periphery of which is bonded rubber sleeve 24. Between the drive shaft and the box the mandrel further includes a guide 25 whose outer periphery 26 may if desired be provided with wear resistant hard metal bands.

The nipple 20 includes a guide 29 whose outer periphery 30 may also, if desired, be provided with wear resistant hard metal bands. The nipple 20 further includes a stop 31 having a downwardly facing shoulder 32. The nipple 20 further includes a backup body 33 having an upwardly facing shoulder 34 and a peripheral annular wear indicator groove 35. A slush pump piston type seal ring 36 is disposed around the upper end of nipple 20 against shoulder 34. An annular apertured dished end plate 37 is disposed around nipple 20 above seal ring 36 and is held thereagainst by a split elastic ring 38 snapped into groove 39 in nipple 20.

The connection 10 further includes a tube made up of a drive shell 45 threadedly connected to a sub 46 thereabove and a shoe 52 therebelow.

The drive shell 45 is bonded at its inner periphery to the outer periphery of sleeve 24. There are a plurality of axial holes 47 through sleeve 24, as best shown in FIGURE 3. As shown in FIGURE 3, the axial holes 47 are symmetrically disposed around the axis of sleeve 24, being equally circumferentially spaced apart. The holes divide up the sleeve into a plurality of arcuate sections 48. The holes are nearer the outer periphery of the sleeve than the inner periphery, thereby maintaining more nearly uniform the amount of rubber in the inner and outer parts of the sleeve to more uniformly distribute load stresses thereon. Since the holes do not have a diameter equal to the full wall thickness of the rubber sleeve 24, there remain inner webs 49 and outer webs 50 between the arcuate sections 48, whereby the whole sleeve is integral. However the holes could be made so large that the sections are completely separated. The holes could have rectangular or trapezoidal or other cross-sections instead of the circular cross-section shown. Such a construction is shown in FIGURE 3A where the holes 47a are of substantially rectangular cross-section and completely separate the sleeve sections 48a. The holes are formed by suitable core rods held in place in the annulus between drive shaft 23 and drive shell 45 while the rubber is injected therebetween and vulcanized.

Referring again to FIGURES 2A and 2B the lower and upper ends of the sleeve are provided with fillets 51, 51' which exist prior to the vulcanizing of the sleeve and help prevent excessive shrinkage stresses at the ends of the sleeve, the fillets deepening during vulcanization of the sleeve.

The sleeve rubber should have as much resilience as possible, like natural rubber, and as much oil resistance as synthetic rubber such as nitrile rubber. As a compromise it is preferred to use neoprene rubber for the material of sleeve 24.

By providing holes and fillets to relieve the shrinkage stresses in rubber sleeve 24, the sleeve can be made with a larger length thickness ratio than has heretofore been thought possible. Making the sleeve longer reduces the unit stress in the rubber for any given torque or axial load transmitted between pipe and tube. As shown in FIGURE 1 the sleeve has a length greater than its diameter.

It is also to be observed that making the sleeve thicker reduces the unit stress in the rubber for any given rotational or axial displacement of the pipe and tube relative to each other. For this reason it is a further feature of the invention to make the outer periphery of the drive shaft and the inner periphery of the drive shell conical, e.g., ¼ inch taper per foot as shown. The rubber sleeve 24 will preferably have a constant wall thickness, the tapers being equal. With this construction the rubber has a maximum thickness while maintaining the necessary wall thickness of drive shaft and drive shell to provide adequate strength thereof.

Shoe 52, screwed into the bottom end of shell 45, includes a guide 53 having an inner peripheral surface 53' which makes a sliding fit with outer peripheral surface 26 of guide 25. Guide 53 is free to move axially relative to guide 25 and to rotate thereon about their common axis but is held against lateral movement relative thereto. Shoe 52 also includes a vent 55 to the annular space 56 between shoe 52 and mandrel 21 below sleeve 24 and above guides 25, 53.

Into the upper end of shell 45 is screwed a ring including at its lower portion a guide 58 and at its upper portion a stop 59. Although shown integrally connected as one ring, guide 58 and stop 59 could be made as separate rings. Stop 59 has a bevel 60 around its upper inner peripheral edge and an upper surface 61 opposite shoulder 32 on stop 31. Stops 31 and 59 limit relative axial movement of the pipe and tube in one direction, whereby should the rubber sleeve 24 or its bonds to drive shaft 23 or drive shell 45 fail, the connection still will retain the bit when the drill collar is lifted.

Guide 58 has an inner peripheral surface 62 which makes a sliding fit with outer peripheral surface 30 of guide 29. Guide 58 is free to move axially relative to guide 29 and to rotate thereon about their common axis but is held against lateral movement relative thereto. The annular space 63 between the upper end of shell 45 and nipple 20 above sleeve 24 is vented by the holes 47 in the sleeve.

Guides 29, 58 above sleeves 24 and guides 25, 53 below sleeve 24 prevents bending stress being imposed on the sleeve.

The ring comprising guide 58 and stop 59, and the liner 71 now to be described, form additional parts of the tube previously referred to as including shell 45, sub 46, and shoe 52.

Sub 46 includes a threaded pin 70 at its upper end for making a threaded connection with a box on the bottom of the drill collar sub.

A liner 71 is press or shrink fitted within sub 46 in fluid tight engagement therewith. The upper end of liner 71 engages against a downwardly facing locating shoulder 72 formed on the inner periphery of sub 46. The inner periphery of liner 71 makes sliding sealing engagement with seal ring 36. Both liner 71 and seal ring 36 are replaceable. Seal ring 36 is made of rubber compound reinforced with canvas in the portion thereof adjacent backup body 33. The unreinforced portion of seal ring 36 adjacent end plate 37 is dished somewhat less than end plate 37 to as to allow room for expansion of the rubber, confined on its outer periphery by liner 71, such expansion occurring when the rubber heats or absorbs fluid. Since room is left for expansion, no undue stresses are imposed on seal ring 36 so that its life is prolonged. Also, the annular lip 73 of the seal ring remains free to flex outwardly against the liner under the pressure of fluid within the connection, e.g. drilling mud passing therethrough from the drill collar to the drill bit. The seal prevents loss of drilling mud and pressure through the holes 47 in sleeve 24.

Instead of placing connections 10 between a drill bit and drill collar sub as shown, the drill collar sub can be omitted and a drill collar screwed directly to the top of connection 10. In such case sub 46 would be provided with a threaded box to accommodate the usual pin on the bottom of the drill collar. The box 22 at the bottom of the mandrel 21 can be replaced by a pin in case it is desired to connect directly to a bit having a box instead of the usual pin.

As shown, the upper threaded member, pin 70, is on the tube and the lower threaded member, box 22, is on the pipe, but this can be reversed, putting the upper threaded member on the pipe and the lower threaded member on the tube.

Referring now to FIGURES 4A and 4B, and 5 there is shown a modified form of connection embodying the invention. Generally the connection is the same as that shown in FIGURES 2A, 2B, and 3, and only the points of difference will be described. Numbers 100 larger will be used for the like parts of the FIGURES 4A, 4B, and 5 embodiments of the invention.

Referring first to FIGURE 4A, the holes 147 do not extend clear to the upper end of sleeve 124 but terminate short of the fillet in the upper end of the sleeve by a distance less than the diameter of the sleeve. A solid rubber annulus or annular diaphragm 136 is thus left forming a seal between drive shaft 123 and drive shell 145 instead of the sliding seal 36 of the previously described embodiment. This is a satisfactory arrangement for relatively low pressures, e.g. below 500 p.s.i. For higher pressure service the slush pump piston type seal 36 cooperating with liner 71 is desirable.

In order to support the upper ends of the mold rods for making holes 147, threaded radial holes 200 are provided in shell 145, into which plugs can be screwed to support the rods. The rod support plugs are removed when the rubber sleeve has been vulcanized and the rods are to be removed. Other plugs can be inserted to close these holes if desired. However a slight flow of mud through the rubber sleeve holes 147 paralleling the upward flow of mud outside the connection will tend to cool the rubber and prolong its life; therefore holes 200 are preferably left open.

Referring to FIGURE 4B, for the simple circular cross-section guide surfaces 26, 53' of the lower guides 25, 53 of the connection first described, there are substituted non-circular cross-sections, namely splines, as more clearly shown in FIGURE 5. Thus, there are splines 210 on the pipe and 211 on the tube. There are spaces 212, 213 between the splines so that the pipe and tube are free to rotate relative to each other until the splines engage. The splines limit the maximum torque that can be applied to the rubber sleeve without interfering with the relative axial movements of the pipe and tube. The inner periphery 213' of splines 211 and the outer periphery 214 of splines 210 provide guide surfaces cooperating with the opposing surface between the splines, thereby performing the lateral guide function of the lower guides of the first described embodiment. In order to permit easy assembly, splined guide 126 on the pipe is made as a separate ring and cemented to the mandrel 121, e.g. with an epoxy resin.

The larger space 212 is provided to allow for normal relative displacement of pipe and tube due to normal drilling torque which is usually always in the same direction. In other words, during normal drilling the rubber sleeve will have been stressed enough so that spaces 212, 213 are about equal and the pipe and tube can be displaced resiliently an equal amount in either direction when irregularities in drilling resistance impose greater than normal or less than normal torque on the rubber sleeve. However due to space 213 being small, only slight reverse torque can be applied to the rubber sleeve before the splines contact and take any further back torque. And space 212 is not so large but that the splines contact in case of excessive forward or normal torque.

The splined guide just described could also be used in the first described embodiment if desired.

A feature common to both forms of the invention is the axial stressing of the rubber sleeve due to the pressure of the mud inside the drill string acting on the seal at the upper end of the sleeve and forcing the bit downwardly relative to the drill collar sub or drill collar. When an axial load is imposed on the bit through the rotary drive unit, the load taken by the rubber element is decreased by an amount equal to the area of the piston times the pressure drop across the drive unit.

While preferred embodiments of the invention have been shown and described, many modifications thereof can be made by one skilled in the art without departing from the spirit of the invention and it is desired to protect by Letters Patent all forms of the invention falling within the scope of the following claims.

I claim:

1. A rotary drive fluid conduit connection comprising a pipe,
a rubber sleeve around the outside of the pipe,
a tube around the outside of the sleeve,
said sleeve being bonded to said pipe and tube,
a seal between said pipe and tube connected to said pipe,
said seal having a surface disposed transversely of the sleeve axis and exposed to the pressure of fluid in said pipe.

2. A rotary drive fluid conduit connection comprising a pipe,
a rubber sleeve around the outside of the pipe,
a tube around the outside of the sleeve,
said sleeve being bonded to said pipe and tube,
said sleeve having a plurality of axially extending holes therein,
said holes extending all the way to both ends of said sleeve, and
a seal between said pipe and tube,
said seal being axially slidable and separate from said sleeve.

3. A rotary drive fluid conduit connection comprising a pipe,
a rubber sleeve around the outside of the pipe,
a tube around the outside of the sleeve,
said sleeve being bonded to said pipe and tube,
said sleeve having a plurality of axially extending holes therein,
said holes extending all the way to both ends of said sleeve,
said tube including a sub and
a liner fitted inside said sub with an interference fit and in sealing engagement therewith,
said pipe including a backup body and a ring removably held against said body and in sliding sealing engagement with said liner,
said ring providing an axially slidable seal and being separate from said sleeve.

4. A rotary drive fluid conduit connection comprising a pipe,
a rubber sleeve around the outside of the pipe,
a tube around the outside of the sleeve,
said sleeve being bonded to said pipe and tube,
said sleeve having a plurality of axially extending holes therein,
a seal between said pipe and tube, and
cooperating lateral guides on said pipe and tube at both ends of said sleeve.

5. A rotary drive fluid conduit connection comprising a pipe,
a rubber sleeve around the outside of the pipe,
a tube around the outside of the sleeve,
said sleeve being bonded to said pipe and tube,
said sleeve having a plurality of axially extending holes therein,
a seal between said pipe and tube,
cooperating splines on said pipe and tube,
the splines on the pipe being circumferentially spaced from the splines on the tube,
said pipe including a hollow mandrel and a ring cemented to the mandrel,
said splines on the pipe being formed on the outer periphery of said ring.

6. A rotary drive fluid conduit connection comprising a pipe,
a rubber sleeve around the outside of the pipe,
a tube around the outside of the sleeve,
said sleeve being bonded to said pipe and tube,
lateral guides on said pipe and tube at both ends of said sleeve, and
a seal between said pipe and tube,
said seal being an annular flexible diaphragm,
the outer periphery of the diaphragm being connected to the inner periphery of the tube and the inner periphery of the diaphragm being connected to the outer periphery of the pipe.

7. A rotary drive fluid conduit connection comprising a pipe,
a rubber sleeve around the outside of the pipe,
a tube around the outside of the sleeve,
said sleeve being bonded to said pipe and tube,
lateral guides on said pipe and tube at both ends of said sleeve, and
a seal between said pipe and tube,
said seal being an axially slidable seal separate from said sleeve.

8. A rotary drive fluid conduit connection comprising a pipe,
a rubber sleeve around the outside of the pipe,
a tube around the outside of the sleeve,
said sleeve being bonded to said pipe and tube,
lateral guides on said pipe and tube at both ends of said sleeve,
said tube including a shell and a ring screwed into said shell at one end thereof surrounding said pipe,
said ring having a portion forming the lateral guide on said tube at one end of said sleeve,
said ring having another portion forming a stop on said tube,
said pipe having a stop thereon adjacent said stop on the tube,
said stops being spaced apart in the axial direction in the unloaded state of the connection but limiting relative axial movement of said pipe and sleeve in one direction when said connection is loaded,
said pipe including a threaded box at one end of the connection for connection to a drill bit and said tube including a threaded member at the other end of the connection for connection to a portion of a drill string,
said stops being disposed with the stop on the tube closer to said box than is the stop on the pipe so as to limit axial separation of said box and member.

9. A rotary drive fluid conduit connection comprising a pipe,
a tube around the outside of the pipe,
rubber means between the tube and pipe to transfer force therebetween,
said rubber means being bonded to said pipe and tube,
said rubber means having elongated passage means extending therethrough all the way from one end to the other, and
means sealing between said pipe and tube.

10. Combination of claim 9 wherein
said tube includes a sub and
a liner fitted inside said sub and sealed thereto,
said pipe includes a backup body, and
said seal is a ring held against said body and in sliding engagement with said liner.

11. A rotary drive fluid conduit connection comprising
a pipe,
a tube around the outside of the pipe
rubber means between the tube and pipe to transfer force therebetween,
said rubber means being bonded to said pipe and tube,
said rubber means having elongated openings therein disposed with their axes extending longitudinally of the pipe and tube, and
cooperating lateral guide means on said pipe and tube at both ends of said sleeve preventing relative motion of said pipe and tube transverse to said openings in said rubber means.

12. A rotary drive fluid conduit connection comprising
a pipe,
a tube around the outside of the pipe and radially separated therefrom leaving an annulus therebetween,
rubber means to transfer force between the pipe and tube,
said rubber means being bonded to said pipe and tube,
said rubber means having elongated openings therein disposed with their longitudinal axes extending longitudinally thereof,
said rubber means being wholly within said annulus leaving the ends of said pipe and tube free for relative axial motion in both directions,
and cooperating lateral guide means on said pipe and tube at both ends of said sleeve preventing relative motion of said pipe and tube transverse to said openings while allowing relative axial and azimuthal motion therebetween,
said rubber means having a circular cross-section at its inner and outer peripheries to resist azimuthal relative motion of said pipe and tube by shearing stresses without pure compression of the rubber.

13. A rotary drive fluid conduit connection comprising
a pipe,
a rubber sleeve around the outside of the pipe,
a tube around the outside of the sleeve,
said sleeve being bonded to said pipe and tube,
the outer periphery of said pipe where bonded to said sleeve being conically tapered,
the iner periphery of said tube where bonded to said sleeve being conically tapered correlative to the outside of said pipe,
said pipe having a threaded member at on end thereof,
said tube having a threaded member at the end thereof opposite from the first said threaded member,
said outer and inner peripheries of said pipe and tube flaring progressing axially in the direction from the second said threaded member toward the first said threaded member,
said rubber sleeve having elongated holes therein of uniform cross-section transverse to their length,
said holes being disposed with their longitudinal axes parallel to the cone elements of said conically tapered outer and inner peripheries of said pipe and tube.

14. Combination of claim 13 in which said uniform cross-sections of said holes are circular whereby the holes are cylindrical,
said cylindrical holes being radially separated from said outer and inner peripheries of the pipe and tube placing them interior of the rubber sleeve,
said holes being disposed with their cylinder axes closer to the inner periphery of the tube than to the outer periphery of the pipe.

15. A rotary drive fluid conduit connection comprising
a pipe,
a tube around the outside of the pipe and radially separated therefrom leaving an annulus therebetween,
rubber means in said annulus to transfer force between the pipe and tube,
said rubber means being bonded to said pipe and said tube,
said rubber means filling less than the entirety of the portion of said annulus between the ends of the rubber means leaving a plurality of spaces therein,
said spaces extending longitudinally of said rubber means,
said spaces extending in one direction all the way to one end of said rubber means,
said spaces extending in the opposite direction to within a distance from the other end less than the length of said spaces.

16. Combination of claim 15 in which the distance between said other end of said rubber means and the nearest ends of said spaces is less than the diameter of said annulus.

17. Combination of claim 15 in which said other end of said rubber means has a fillet therein extending toward the nearest ends of said spaces.

18. A rotary drive fluid conduit connection comprising
a pipe,
a tube around the outside of the pipe and radially separated therefrom leaving an annulus therebetween,
rubber means in said annulus to transfer force between the pipe and tube,
said rubber means being bonded to said pipe and said tube,
the length of said rubber means from one end thereof to the other being greater than the diameter of said annulus,
said rubber means filling less than the entirety of the portion of said annulus between said ends of the rubber means leaving a plurality of elongated spaces therein,
said spaces being disposed with their longitudinal axes extending longitudinally of said rubber means,
the longitudinal extent of said spaces exceeding the diameter of said annulus,
said spaces opening at one end of said rubber means,
said spaces terminating at their other ends short of the other end of said rubber means,
said rubber means at said other end thereof being a solid rubber annulus sealing between said tube and said pipe.

19. A rotary drive and axial load transmitting connection comprising
a pipe,
a tube around the outside of the pipe and radially separated therefrom leaving an annulus therebetween,
rubber means in said annulus to transfer force between the pipe and tube,
said rubber means being bonded to said pipe and said tube,
the length of said rubber means from one end thereof to the other being greater than the diameter of said annulus,
said rubber means filling less than the entirety of the portion of said annulus between said ends of the rubber means leaving a plurality of elongated spaces therein,
said spaces being disposed with their longitudinal axes extending longitudinally of said rubber means,
the longitudinal extent of said spaces exceeding the diameter of said annulus,
each end of said rubber means having a deep fillet thereon extending annularly therearound and having a depth at least as great as the radial thickness of said rubber means,
said deep fillets and elongated spaces cooperating to provide surface area to relieve molding stresses in said rubber means due to the great length of the rubber means relative to the diameter thereof,
said rubber means having a circular cross-section at its inner and outer peripheries to resist azimuthal relative motion of said pipe and tube by shearing stresses without pure compression of the rubber.

References Cited in the file of this patent

UNITED STATES PATENTS

| | | |
|---|---|---|
| 1,960,688 | Archer | May 29, 1934 |
| 2,259,460 | Dexter | Oct. 21, 1941 |
| 2,394,405 | Schjolin | Feb. 5, 1946 |
| 2,765,147 | Vertson | Oct. 2, 1956 |
| 2,795,398 | Ragland | June 11, 1957 |

FOREIGN PATENTS

| | | |
|---|---|---|
| 458,167 | Canada | July 18, 1949 |